United States Patent [19]

Schenck

[11] 4,402,116
[45] Sep. 6, 1983

[54] CONCEALED INTERLOCKING FASTENER

[76] Inventor: Alexander W. Schenck, 2991 Chapshire Dr. SE., Grand Rapids, Mich. 49506

[21] Appl. No.: 157,889

[22] Filed: Jun. 9, 1980

[51] Int. Cl.$^3$ ............................................. A44B 17/00
[52] U.S. Cl. ................................. 24/217 R; 411/403
[58] Field of Search ............... 24/213 R, 216, 217 R, 24/217 W, 218, 219, 220; 411/403, 404, 405

[56] References Cited

U.S. PATENT DOCUMENTS

| | | | |
|---|---|---|---|
| 308,246 | 11/1884 | Frearson | 411/404 |
| 1,149,141 | 8/1915 | Hook | 24/216 X |
| 2,767,005 | 10/1956 | Jorgensen | 24/217 X |
| 3,086,803 | 4/1963 | Wilson | 292/17 |
| 3,601,776 | 8/1971 | Curl | 24/216 X |
| 3,741,594 | 6/1973 | Ostling | 24/217 R |
| 4,169,308 | 10/1979 | Minogue | 403/33 X |

FOREIGN PATENT DOCUMENTS

| | | | |
|---|---|---|---|
| 765154 | 8/1967 | Canada | 24/213 R |
| 2451373 | 7/1975 | Fed. Rep. of Germany | 411/403 |
| 426951 | 11/1947 | Italy | 24/217 |

*Primary Examiner*—Thomas J. Holko
*Attorney, Agent, or Firm*—Miller, Morriss & Pappas

[57] ABSTRACT

A concealed and joint forming fastener structure in which two screws with differing but telescopically interrelated heads are pressed together allowing the planes of the structural elements to which the screws are attached to come together flushly and with one screw head projecting into a recess in the other screw head and one of said screws located in a recess or socket in one of the structural elements.

8 Claims, 11 Drawing Figures

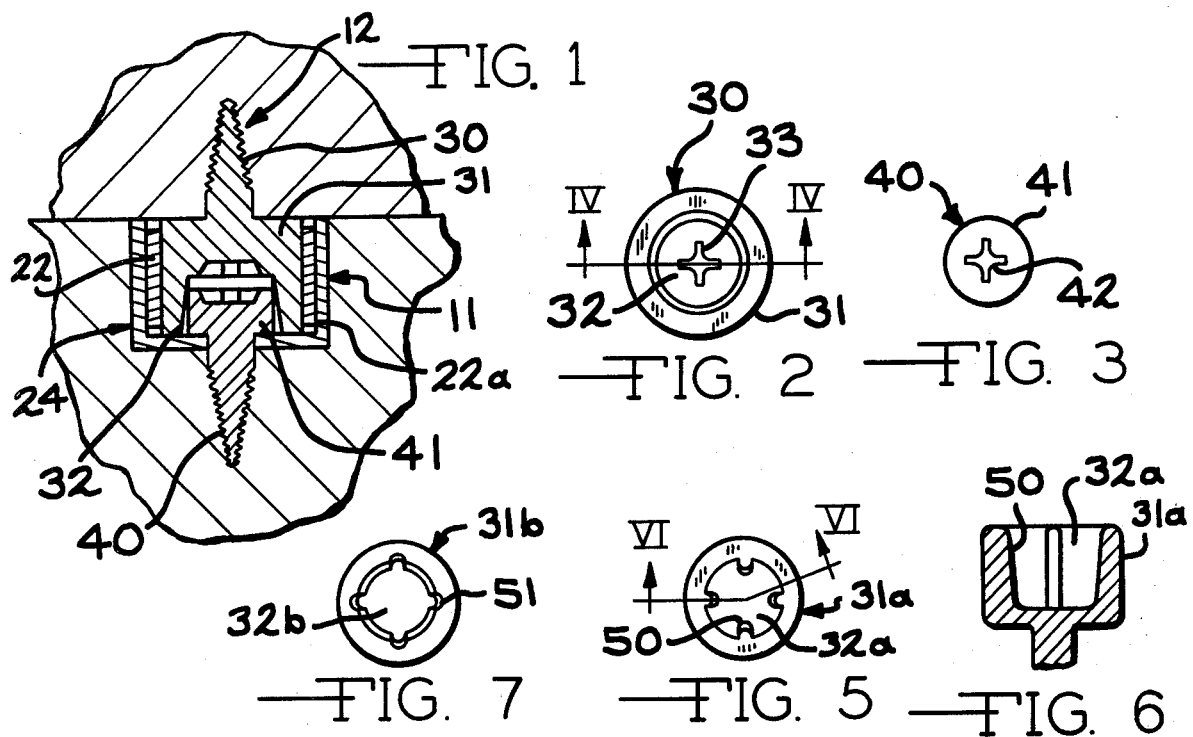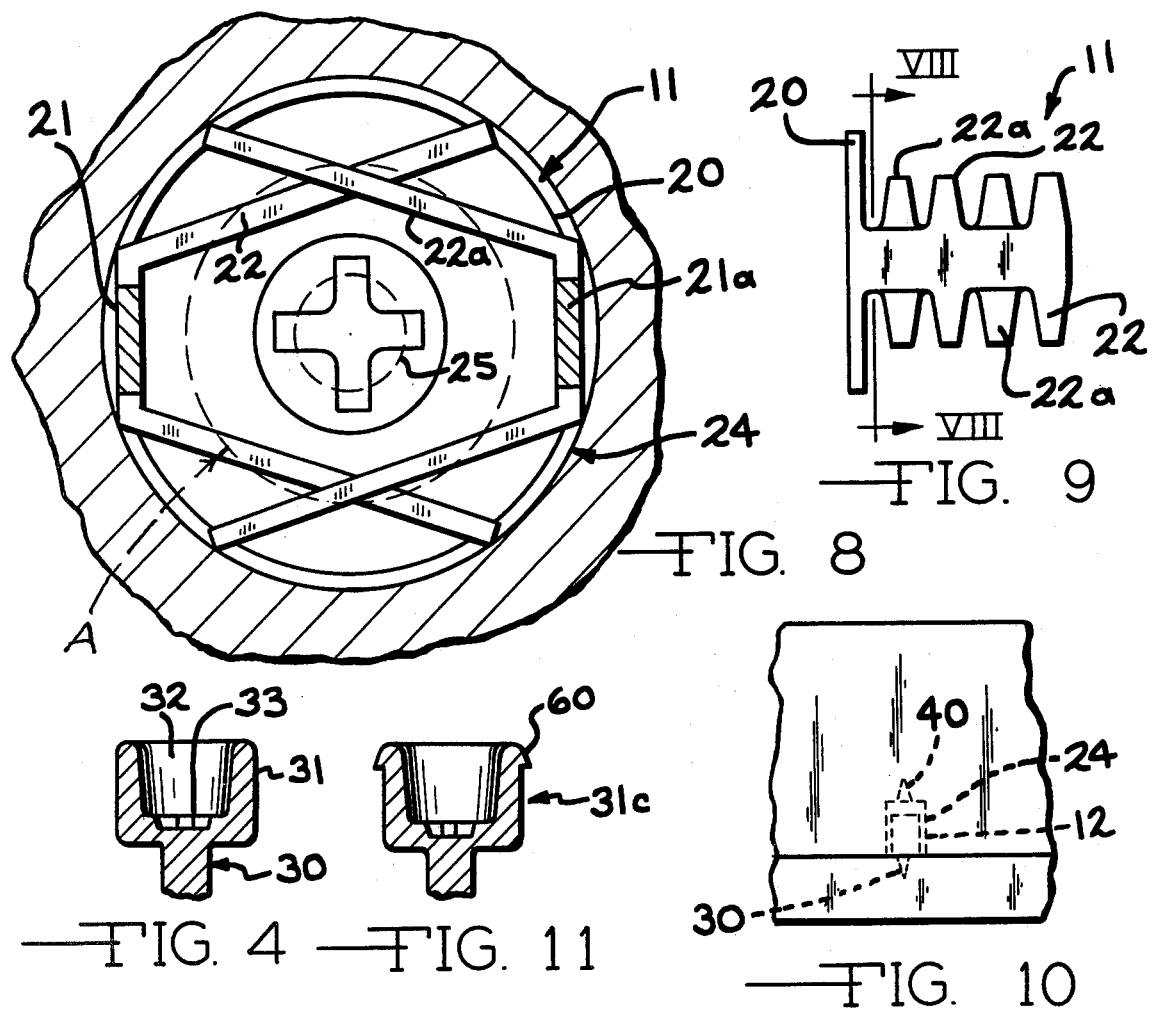

CONCEALED INTERLOCKING FASTENER

BACKGROUND OF THE INVENTION

This invention relates to fasteners for joining a pair of panels or structural elements. This is the type of fastener which consists of at least two parts with one part being secured to one panel and a second part being secured to the other panel. When the fasteners have been secured to their respective panels, the panels are pushed together forming a concealed, self-locking joint which results from interengagement of the fasteners as the panels are pushed together. Fasteners of this general type have been known and used for many years. An improvement in such fasteners is disclosed in my co-pending application Ser. No. 157,888 entitled "Telescoping Fastener" filed on even date herewith. This invention is a further improvement over the fastener disclosed in that application.

The present invention is designed to provide a positive joint which will withstand severe rocking and shear loading. At the same time it retains the relatively low cost simplicity and my initial invention while broadening its utility by making it suitable for use under severe conditions.

BRIEF DESCRIPTION OF THE INVENTION

The fastener of this invention, when the two portions of the fastener are snapped together, provides the positive support for the male portion by the female portion disclosed in my co-pending application. For this purpose, it utilizes the interengaging fingers on the female portion of the fastener for positively engaging and clamping the male portion. This thus stiffens the fastener sufficiently to provide a positive joint even though the fastener is manufactured of a relatively thin sheet metal material. This invention, however, adds to this fastener a telescoping interfit between the heads of the screws which secure the fastener portions to the respective panels or structural elements. This is done by making the head of the screw for one of the fasteners tubular to create a blind opening therein and making the head of the screw for the other fastener portion of a size to snuggly telescope or fit into this opening. Thus, these interfitting heads form a joint having positive resistance against relative movement of the panels which would create shear loading across the joint. Thus, the clamping engagement of the remaining portions of the fastener are then only required to prevent panel separation as a result of loads imposed axially of the fasteners.

Simply stated, the concealed fastener is for flush fastening structural elements by pressing them together and at the heart of the system is a first screw and a second screw, the screws having telescopically and frictionally intefitting heads, one coaxially located within the other when pressed together. One screw is fastened to project from a surface of a structural element to be joined and the other screw is in a recess provided in another structural element such as a panel to be joined. When coaxially urged together, the fit between heads is firmed, aligned, and secured frictionally against separation axially.

BRIEF DESCRIPTION OF THE DRAWINGS

FIG. 1 is a central, sectional view of a fastener combination incorporating this invention.

FIG. 2 is an end view of the head of the female portion of the inner fastener member.

FIG. 3 is an end view of the head of the male portion of the inner fastener.

FIG. 4 is a sectional view taken along the plane IV—IV of FIG. 2.

FIG. 5 is an end view of a modified form of the head illustrated in FIG. 2.

FIG. 6 is a sectional view taken along the plane VI—VI of FIG. 5.

FIG. 7 is an end view of a further modification of the head of the fastener illustrated in FIG. 2.

FIG. 8 is an end view of the female portion of the outer section of the fastener installed in a panel recess and taken along the plane VIII—VIII of FIG. 9.

FIG. 9 is a side elevation view of the female portion illustrated in FIG. 8.

FIG. 10 is a fragmentary, elevation view of a pair of joined panels illustrating the relationship of the fastener to the panels.

FIG. 11 is a sectional view similar to FIG. 4 but illustrating a modified construction for the fastener head.

DESCRIPTION OF THE PREFERRED EMBODIMENT

Referring to FIG. 1, the numeral 10 indicates a fastener having an outer or cage portion 11 and an interengaging and telescoping inner portion 12. The outer or cage portion 11 is the same as that described in my co-pending application referred to above. As best seen in FIGS. 8 and 9, it consists of a base 20 having a pair of upstanding arms 21 and 21a which extend in parallel and diametrically opposed relationship at right angles to the base 20. Extending from each side of the arms are pairs of fingers 22 and 22a. These fingers are of a length such that they extend substantially most of the way across the width of the cage and are so arranged that the pairs on one arm will interfit between the fingers of the other arm. Thus, as is best seen in FIG. 9, the fingers 22a interfit between the fingers 22.

As is illustrated in FIG. 8, the size of the cage or fastener portion 11 is such that when it is seated in a recess 24 of the proper size, the ends of the fingers 22 and 22a bear against the sidewalls of the recess. At the same time the ends of the fingers where they join the arms 21 and 21a also are seated against the walls of the recess. The fastener portion 11 can be made by any of several production methods. A hole 25 is formed in the base to receive the fastener for securing it to the panel on which it is to be mounted. Normally it is made from strip or sheet carbon steel having a thickness of 0.040 to 0.080 of an inch and, after being bent into the shape shown in FIGS. 8 and 9, it is heat treated to give it spring characteristics.

The inner fastener portion 12 consists of a pair of screws 30 and 40. The screw 30 has an enlarged head 31 which has a blind opening or pocket 32 opening through one end and extending to a substantial depth within the head. Preferably the walls of this opening are slightly, inwardly tapered both to facilitate forming and to facilitate the joining of the panels (FIGS. 2 and 4). The opening 32, either in its walls or its base, has suitable means to engage a tool such as the recess 33 for a Phillips head screwdriver. At its outer end the shell or rim of the head is slightly rounded or chamfered on both the inner and outer sides to facilitate assembly of the fastener when the panels are joined. The shank of the screw 30 is conventional and suitably threaded for the material such as wood from which the panel is made.

The second portion 40 of the inner fastener 12 is the male portion of the fastener and consists of a screw also having a head 41 equipped with a suitable tool engaging means such as a cross-slot 42 for receiving a Phillips head screwdriver. The diameter of the head 40 is such that it can be snuggly and slidably received within the opening 32 in the head 31 and will form a binding or interference fit with the walls of the opening 32. The slight taper to the inner walls of the opening 32 helps to provide a wedged fit as the two screw heads are telescoped together.

It will be recognized that the inner fastener portion 30 can have any of a number of suitable structures which adapt it to being engaged by a tool. FIGS. 5 and 6 illustrate one possible modification in which the inner walls of the central recess 32a of the head 31a are provided with a plurality of inwardly extending ridges 50 which will engage a conventional screwdriver for the purpose of installing the fastener. The diameter of the head portion of the screw 40 will be sized to assure a positive engagement with these ridges. FIG. 7 illustrates the reverse arrangement in which, instead of ridges, the head 31b has recesses 51 in the walls of the opening 32b. Other conventional configurations for engagement with a tool can be substituted.

The threaded screws or fasteners 30 and 40, when used together without the cage element 24, provide a push fit stabilized by the sizing of selected fit as between the surfaces 32 and the head 41. The frictional engagement may be by way of detents, engaging grooves or ridges or by wedging action upon assembly and provide a firm concealed fastener as between two structural elements or panels.

To install the fastener, a blind opening or recess 24 is formed in the edge of one panel as indicated in FIGS. 8 and 10 and the cage or outer fastening member 11 is installed in the opening by means of the second inner fastener member 40 which is installed through the opening 24 in the center of the base of the outer fastener member 11. Thus, it is secured firmly within the opening. As has been previously described, the ends of the fingers, both adjacent the arms and at their free ends, are in contact with the walls of the opening. Thus, their outward movement is prevented.

The other of the inner fastener member 30 is mounted to the surface of the second panel which is to be connected to the first panel by means of the fastener. The threaded shank portion is screwed into the panel until the head seats against the surface of the panel. When this has been done, the two panels are pushed together forcing the head 31 of the inner fastener portion 30 inside the fingers of the outer fastener member or cage 11 and down over the head of the inner fastener portion 40. As this telescoping movement occurs, the fingers 22 and 22a are forced apart and are caused to arch because both ends of the fingers are locked against outward movement by the walls of the recess 24. At the same time, the arms 21 and 21a are inwardly arched to provide further spring action tightly clamping the fingers about the head 31 of the inner fastener portion 12. This arching occurs because of the diameter of the head 31, the outer diameter of which is indicated by the broken line A in FIG. 8. This deflection of the outer fastener portion or cage is disclosed in my co-pending application referred to above. Simultaneously with the spreading and arching of the fingers 22 and 22a, the hollow head 31 of the fastener portion 30 is telescopically pressed and seated over the head of the fastener portion 40 until a tight fit is obtained. In this manner, a positive interlock is formed which prevents any movement of the fastener portion 30 with respect to the fastener portion 40 which is in shear, that is, at right angles to the shanks of the screw portions of the inner fasteners. Thus, the inner portion resists any type of lateral displacement and forms a concealed operative fastener as between threaded elements 30 and 40 in panel applications. At the same time, the outer fastener portion or cage, gripping the outer face of the inner fastener portion 12 enhances resistance to axial separation of the fasteners and, thus, separation of the panels.

If it is desired to positively prevent any possibility of axial separation, the outer face of the enlarged head 31 of the fastener portion 30 can be provided with circumferential grooves. Alternatively, as shown in FIG. 11, the head 31c can be formed with a radially, outwardly extending lip 60 adjacent its outer end which will pass through the cage or outer fastener portion 11 and seat behind the last of the fingers 22a providing a positive interference lock against any axial movement.

It will be recognized that the fasteners forming the inner fastener portions 30 and 40 can be formed by high speed automatic equipment such as a cold header while the outer or cage portion 11 can be formed by high speed equipment such as an eyelet machine. Thus, the entire fastener, while extremely positive in its anchoring function, is relatively inexpensive and simple. It has a significantly improved capability to resist any type of rocking or inadvertent separation. At the same time it can be entirely concealed when the panels are joined and is capable of quick and easy installation.

Having described my invention, it will be recognized that modifications of the invention can be made without departing from the principles thereof. Such modifications are to be considered as included within the hereinafter appended claims unless these claims by their language expressly state otherwise.

I claim:

1. A fastener for interconnecting a pair of structural elements in a hidden manner, said fastener having a first screw for attachment to one of said elements, said first screw having an elongated hollow head defining a blind cavity opening through one end of said head;
   means in said cavity for receiving a tool and providing a positive interference engagement therewith for rotating said screw;
   a second screw having a head, said head of said second screw having a tool engaging means and having a cross sectional size to slidably and snuggly seat within the cavity of the head of said first screw in a frictional lock and aligned axially therewith; and
   resilient deformable means closing frictionally on said elongated head of said first screw.

2. A fastener as described in claim 1 wherein said means in said cavity is an "X" shaped recess for receiving a Phillips head screwdriver.

3. A fastener as described in claim 1 wherein said means in said cavity are ridges projecting inwardly from the walls of said cavity and extending lengthwise of said cavity.

4. A fastener as described in claim 1 wherein said means in said cavity are elongated recesses in the walls of said cavity and extending lengthwise of said cavity.

5. A fastener as described in claim 1 wherein the inner walls of said cavity at said open end are flared outwardly.

6. A fastener as described in claim 1 wherein said first screw is secured to the surface of one of said elements, said first screw having a shoulder at the end of its head opposite from the open end of said cavity, said shoulder seated against the surface of said element, a blind recess in said second screw of a diameter to receive the head of said first screw, said second screw secured to said other element with its head centered in said recess in axial alignment therewith.

7. A fastener as described in claim 6 wherein said resilient deformable means comprises a lock cage which is seated in said recess and said screws are interlocked in axial register, said cage having a base seated beneath the head of said second screw and arms extending therefrom lengthwise of said recess and spaced apart sufficiently to receive said head of said first screw therebetween, said arms having inwardly extending fingers seated about and gripping the sides of said head of said first screw.

8. A concealed fastener for flush fastening structural elements by pressing them together comprising:
 a first screw;
 a second screw, said first and second screws having telescopically and frictionally interfitting heads, one coaxially located within the other and one of said screws fastened to project from a structural element and the other of said screws fastened in a blind opening of another of said structural elements; and
 frictional fit means securing said heads of said screws in aligned, firm relationship against withdrawal from said blind opening when said screw heads are pressed together and expanding to grip the walls of said blind opening.

* * * * *